US011905751B2

(12) United States Patent
Rudd

(10) Patent No.: US 11,905,751 B2
(45) Date of Patent: Feb. 20, 2024

(54) HOUSING FOR MOUNTING AND ADJUSTING THE ALIGNMENT OF A WINDOW ACTUATOR

(71) Applicants: ABT Systems, LLC, Annville, PA (US); Elizabeth Galvin, Washington, DC (US)

(72) Inventor: Armin F. Rudd, Annville, PA (US)

( * ) Notice: Subject to any disclaimer, the term of this patent is extended or adjusted under 35 U.S.C. 154(b) by 92 days.

(21) Appl. No.: 17/726,524

(22) Filed: Apr. 21, 2022

(65) Prior Publication Data

US 2023/0340828 A1 Oct. 26, 2023

(51) Int. Cl.
*E05F 1/00* (2006.01)
*E05F 15/616* (2015.01)

(52) U.S. Cl.
CPC ......... *E05F 15/616* (2015.01); *E05Y 2201/10* (2013.01); *E05Y 2600/51* (2013.01); *E05Y 2600/626* (2013.01); *E05Y 2900/148* (2013.01)

(58) Field of Classification Search
CPC ........... E05Y 2600/51; E05Y 2900/148; E05Y 2600/626; E05Y 2201/10; E05F 15/616
See application file for complete search history.

(56) References Cited

U.S. PATENT DOCUMENTS

| | | | | |
|---|---|---|---|---|
| 4,521,993 A * | 6/1985 | Tacheny | F16G 13/20 74/606 R |
| 4,945,678 A | 8/1990 | Berner et al. | |
| 5,406,750 A | 4/1995 | Lindgren | |
| 5,829,199 A * | 11/1998 | Harvey | E05F 15/619 49/325 |
| 8,250,846 B2 | 8/2012 | Soerensen | |
| 8,601,745 B2 * | 12/2013 | Berkley | E05F 11/06 49/339 |
| 8,982,441 B2 | 3/2015 | Schlam et al. | |
| 2016/0145923 A1 * | 5/2016 | Hoffman | E05F 1/10 29/426.2 |

FOREIGN PATENT DOCUMENTS

| | | | | |
|---|---|---|---|---|
| EP | 1264955 A2 | 12/2002 | |
| EP | 1813757 A1 | 8/2007 | |
| EP | 1747386 B1 | 12/2007 | |
| EP | 2626491 B1 * | 9/2018 | E05B 47/026 |

OTHER PUBLICATIONS

Email dated Apr. 7, 2021, 03:49.
Email dated Apr. 8, 2021 12:27 AM.
Email dated Apr. 12, 2021, 12:22 PM.
Email dated Apr. 21, 2021, 11:07 PM.
Email dated 4 maggio 2021 18:44 .
Email dated May 5, 2021, 9:57 AM.
CAD Drawingsattached to Email dated May 5, 2021, 9:57 AM.
Email dated Jun. 19, 2021, 12:18 AM.

(Continued)

*Primary Examiner* — Jerry E Redman
(74) *Attorney, Agent, or Firm* — Covington & Burling LLP; Gregory S. Discher

(57) ABSTRACT

A housing for mounting a motorized actuator on or in a fixed portion of a window that allows the actuator to be adjusted in the housing to facilitate alignment of a linkage on the actuator with a linkage on the moveable portion of a window.

8 Claims, 18 Drawing Sheets

(56) References Cited

OTHER PUBLICATIONS

Top and Bottom View CAD Drawingsattached to Email dated Jun. 19, 2021, 12:18 AM.
Left and Right View CAD Drawingsattached to Email dated Jun. 19, 2021, 12:18 AM.
Email dated Jul. 8, 2021, 3:08 AM.
Solution 1 CAD Drawings attached to Email dated Jul. 8, 2021, 3:08 AM.
Solution 2 CAD Drawingsattached to Email dated Jul. 8, 2021, 3:08 AM.
Email dated Jul. 12, 2021, 8:22 PM.

* cited by examiner

HOUSING FOR MOUNTING AND ADJUSTING THE ALIGNMENT OF A WINDOW ACTUATOR

FIELD OF THE INVENTION

Embodiments of the present invention relate to a housing for mounting a motorized actuator on or in a fixed portion of a window that allows the actuator to be adjusted in the housing to facilitate alignment of the actuator linkage with a mating linkage on the moveable portion of the window.

BACKGROUND

As referred to in this document, a window is an opening constructed in a wall, door, or roof for the purpose of admitting light or air to a space within a building enclosure and is framed and spanned with glass mounted to permit opening and closing.

Windows in buildings can be installed with motorized actuators for convenience of opening and closing the movable part of the window. The actuator can be mounted on an exposed fixed surface of a window frame or mounted unexposed and recessed into the fixed frame part of the window. A series of links forming a chain is connected to a moveable portion of the window on one end and is fixed within the actuator on the other end. The chain is driven by a motor within the actuator to extend the chain from the actuator and retract the chain into the actuator, thereby respectively opening and closing the window.

Difficulties can arise in proper mounting alignment between the linkage on the fixed actuator and the linkage on the movable portion of the window, particularly when the actuator is mounted unexposed and recessed into the fixed frame part of a window. Even relatively small misalignments can cause binding of the actuator chain such that the window may not close properly. Misalignments can be caused by imprecise surface mounting of the actuator, imprecise machining of the concealed recess within the window frame, slightly out of square movable portions of the window, slightly out of plumb or level window frame installation, or even window component movement by thermal expansion and contraction. The relatively small tolerances required for proper operation make slight misalignment issues common.

When the window does not close properly and contact the window seals, water, air and noise intrusion can occur, and security can be compromised. Trying to resolve misalignment, such as by remounting the actuator or attempting in-place machining of the linkage on the movable portion of the window, can be time consuming and costly, and may not effectively correct the misalignment.

The actuator and linkage alignment problem can be further complicated when large windows utilize multiple actuators. Under such circumstances, one actuator may not pull the window closed fully while the other actuator does, and thereby cause a potentially dangerous out-of-plane bending force to be applied to the movable portion of the window that could eventually cause the glass to break, especially in the presence of thermal stresses due to indoor to outdoor temperature differences.

SUMMARY OF EMBODIMENTS OF THE INVENTION

The present invention discloses an adjustment feature incorporated into a housing used to mount a window motorized actuator such that the actuator can be finely adjusted within the cavity of the housing to overcome the problem of small misalignments between the actuator linkage and the linkage on the movable portion of the window.

An embodiment of a system comprises a housing that has a cavity for mounting a motorized actuator. The cavity has a length longer than a length of the actuator. A first space between a first end of the actuator and a first end of the cavity, and a second space between an opposing second end of the actuator and an opposing second end of the cavity is provided, when the actuator is laterally centered along the length of the housing.

A first bracket attaches to the first end of the actuator. The first bracket has one or more holes through which a screw is inserted into one or more respective elongated slots in a first end of the housing. A second bracket attaches to the opposing second end of the actuator. The second bracket has one or more holes through which a screw is inserted into one or more respective elongated slots in a second opposing end of the housing. The first and second brackets can have an extended portion that respectively engages a first recess and a second recess in opposing sides of the actuator.

A first clamping plate at the first end of the housing is threaded for receiving the screw inserted through the first bracket and elongated slot. A second clamping plate at the second opposing end of the housing is threaded for receiving the screw inserted through the second bracket and elongated slot, such that the actuator can be positioned within the cavity while the screws are loose to allow for positioning said actuator along said elongated slots. The actuator is secured in position within the cavity when the screws are tightened.

The first clamping plate can be positioned within the cavity, and at least one of the one or more elongated slots in the first end of the housing can be positioned between the first bracket and the first clamping plate. The second clamping plate can also be positioned within the cavity, and at least one of the one or more elongated slots in the second end of the housing can be positioned between the second bracket and the second clamping plate. The first clamping plate and the second clamping plate can also be positioned such that a top lateral surface of the clamping plates is in contact with a bottom lateral surface of the housing.

The system allows the actuator to be positioned so that a movable linkage of the actuator can be secured to a linkage fixed to a moveable portion of a window, and allows the housing to be affixed to a fixed portion of a window frame.

BRIEF DESCRIPTION OF THE DRAWINGS

FIG. 8 is the same).

DETAILED DESCRIPTION OF EMBODIMENTS OF THE INVENTION

Figure 1:
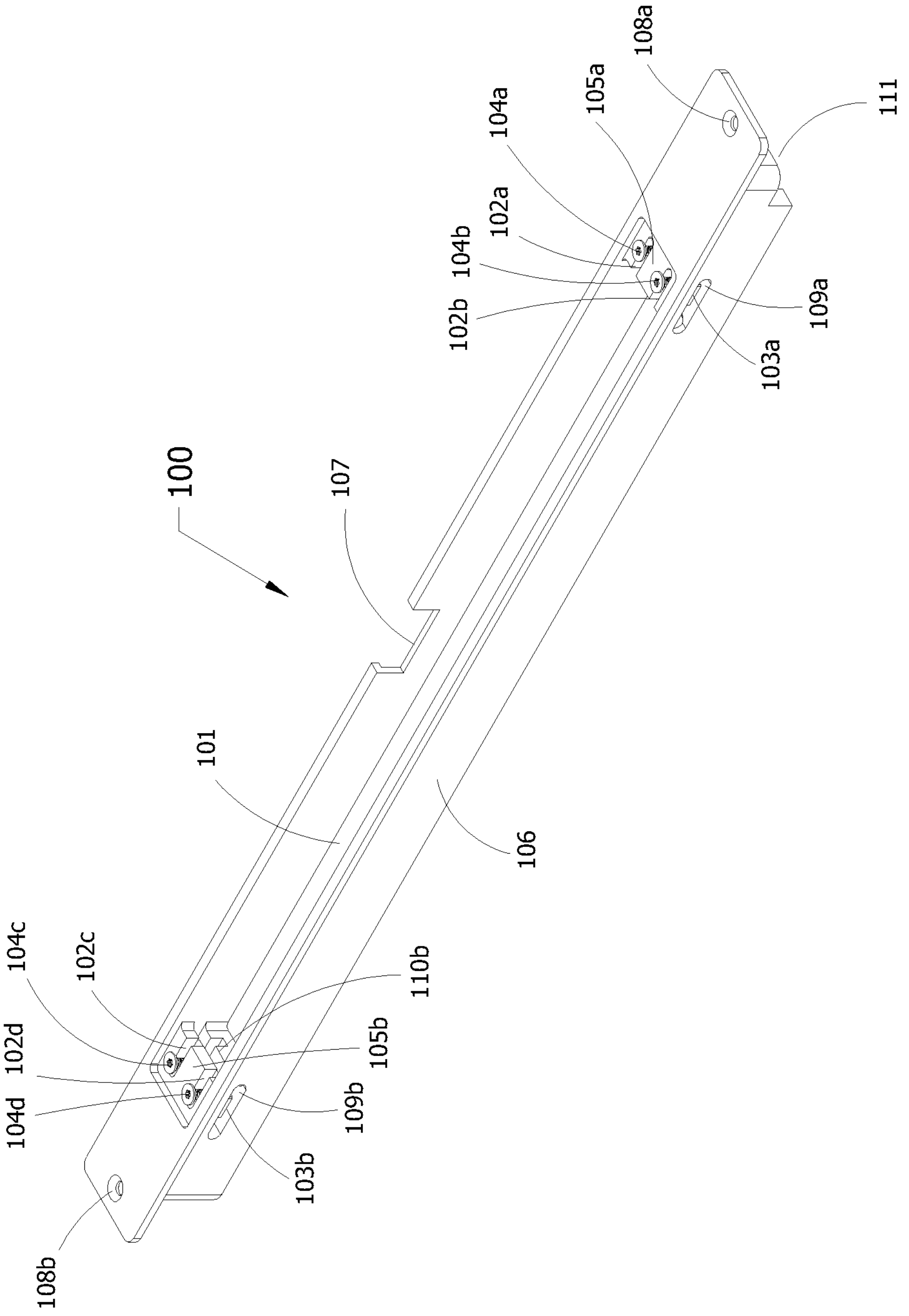
FIG. 1 is an isometric view of a first embodiment of a window actuator housing.

FIG. 1, generally at 100, is an isometric view of a first embodiment of a window actuator housing. To maintain thermal isolation across the window frame, the material the housing is made of should preferably be of low thermal conductivity relative to metal such as polymers: polyamide (PA), polyvinyl chloride (PVC), high density polyethylene (HDPE), acrylonitrile butadiene styrene (ABS). The housing 106 has a cavity 101 in which a window actuator 202 (shown in FIG. 2) is inserted. An actuator such as the KIMO 202 model by Nekos SRL, Colceresa (VI), Italy, can be used.

Screws 104*a*, 104*b* respectively extend through screw slots 102*a*, 102*b* within housing material 105*a*, and to the threaded screw holes of clamping plate 103*a*. Similarly, screws 104*c*, 104*d* respectively extend through screw slots 102*c*, 102*d* within housing material 105*b*, and to the threaded screw holes of clamping plate 103*b*. Clamping plate slots 109*a* and 109*b*, perpendicular to the long axis of the housing 106, create internal void space for the clamping plates 103*a*, 103*b* to be inserted within the cavity 101 of housing 106.

Housing material 110*b* supports clamping plate 103*b* with a small amount of vertical clearance 403 (shown in FIG. 4A) between the clamping plate 103*b* and the clamping plate slot 109*b* to allow the clamping plate 103*b* freedom to move. Screws 104*c* and 104*d* are threaded into the clamping plate 103*b*. A similar arrangement of housing material 110*a* (shown in FIG. 4B), clamping plate 103*a*, clamping plate slot 109*a*, housing material 105*a*, and screws 104*a*, 104*b* is provided on the opposite end 111 of the housing 106. In FIGS. 1-14, element 111 designates the end portion of the housing 106, 501 at which the power wiring (not shown) exits the housing 106, 501.

When screws 104*a*, 104*b*, 104*c*, and 104*d* are tightened, the bottom surface of brackets 201*a* and 201*b* (shown in FIG. 2) and the top surface of clamping plates 103*a* and 103*b* are drawn tight to housing material 105*a* (shown in FIGS. 4A and 4B) and 105*b* between the clamping plates 103*a*, 103*b* and adjustable actuator attachment brackets 201*a*, 201*b*, fixing the actuator 202 within the cavity 101 of housing 106. Screw holes 108*a* and 108*b* provide for attaching the housing 106 to the window frame 1402 fixed in wall 1403, as generally shown in FIGS. 14-18.

Figure 2:
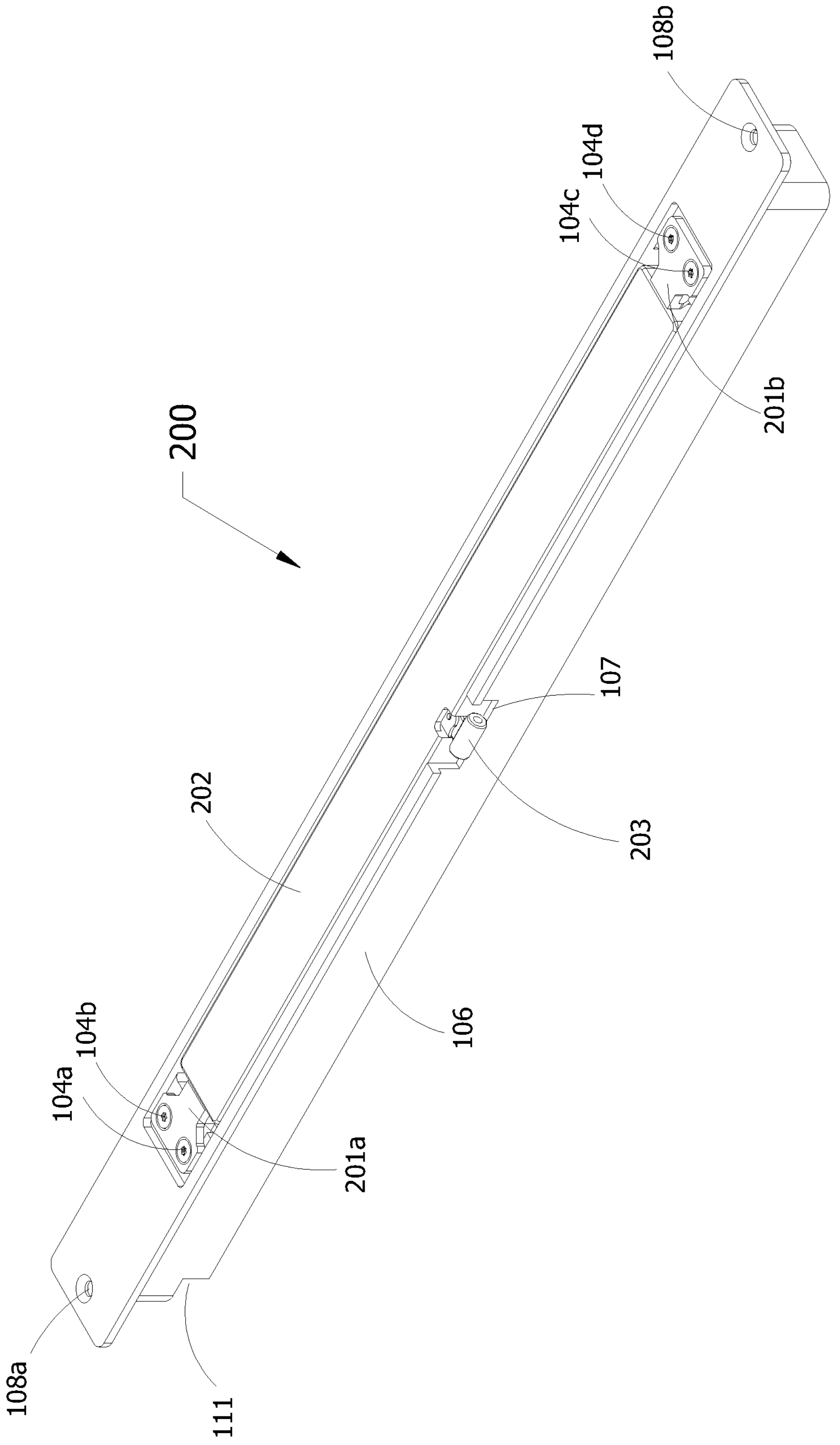
FIG. 2 is an isometric view of FIG. 1, with an actuator having an adjustable actuator attachment at both ends positioned in the housing.
Figure 3:
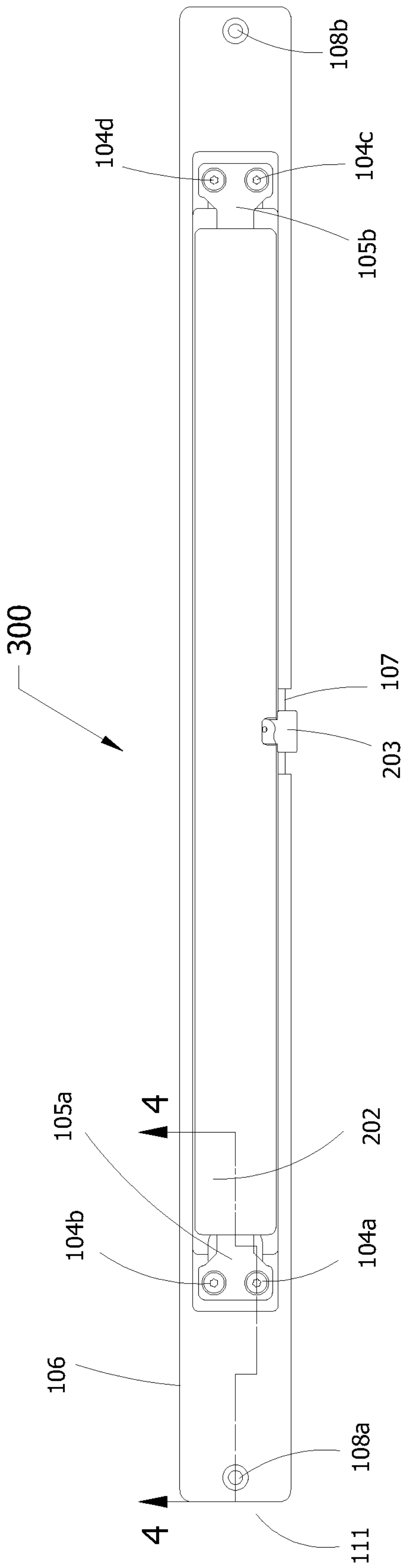
FIG. 3 is a top view of FIG. 2.
Figure 11:
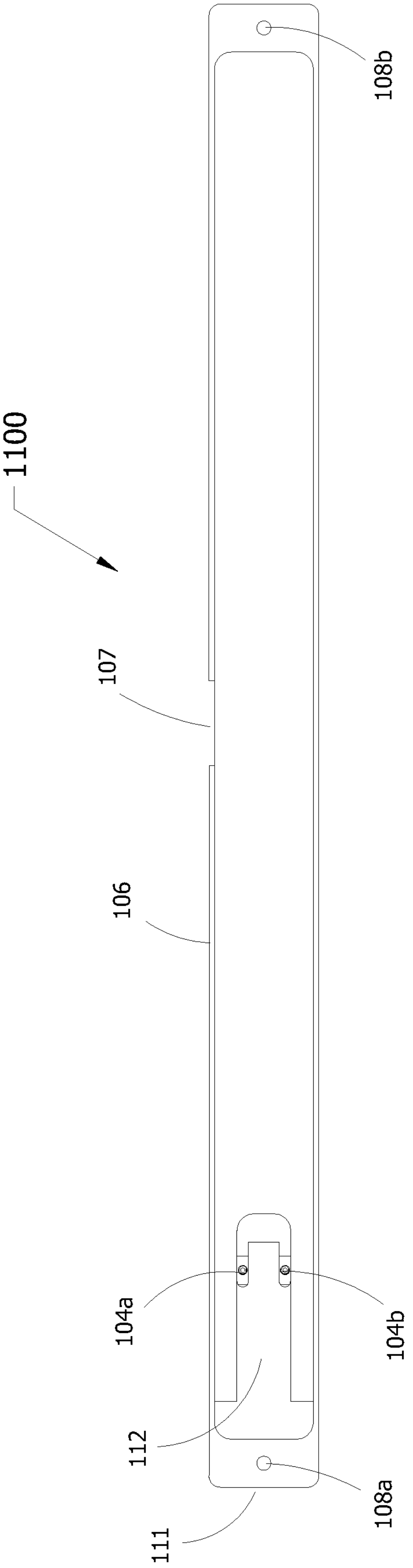
FIG. 11 is a bottom view of FIG. 1.

FIG. 2, generally at 200, is an isometric view of a window actuator housing 106 as shown in FIG. 1, with the actuator 202 having the brackets 201*a*, 201*b* positioned at both ends of the cavity 101 in the housing 106. FIG. 11, generally at 1100, is a bottom view of FIG. 1, and shows a wiring channel 112 that provides an opening for the actuator power wiring (not shown) to be routed out of the housing 106. Brackets 201*a*, 201*b* allow the position of the actuator 202 to be adjusted along the length of the cavity 101 of the housing 106. When screws 104*a*, 104*b*, 104*c*, and 104*d* are loosened, the actuator 202 and brackets 201*a* and 201*b* can be positioned laterally, end-to-end, within the cavity 101 of housing 106 to facilitate quick and precise alignment of the actuator linkage 203 with a fixed linkage 1501 attached to a movable portion 1401 of a window, as shown in FIGS. 15-18. Housing notch 107 provides space for the actuator linkage 203 attached to the actuator chain 1404 (shown in FIGS. 15-18) to extend from and retract into the actuator 202. FIG. 3, generally at 300, is a top view of FIG. 2.

Figure 4A:
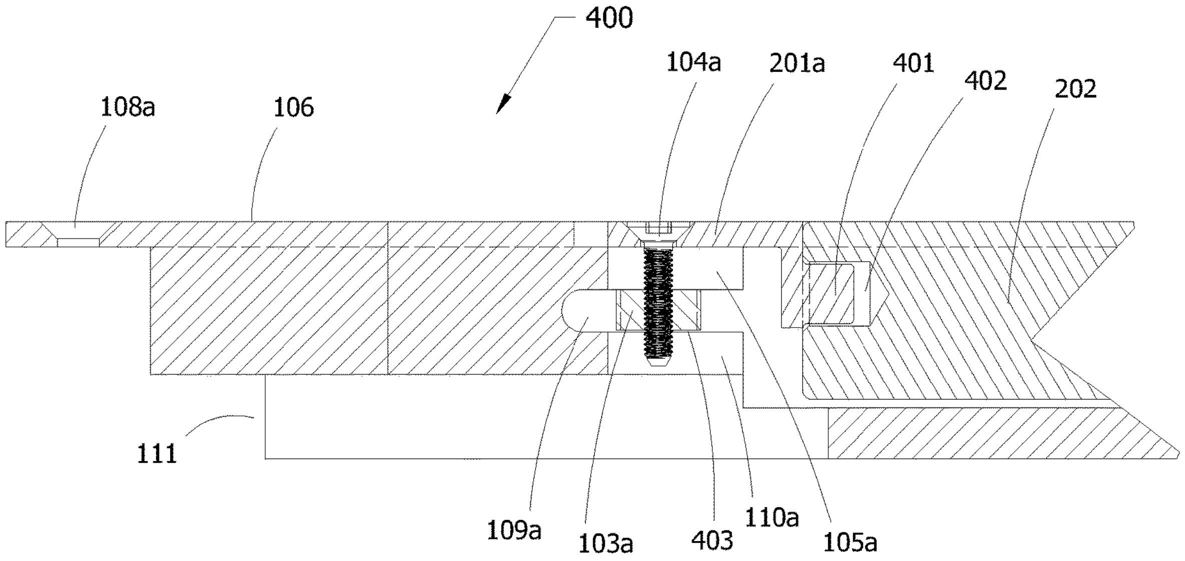
FIG. 4A is a magnified cross section view of FIG. 3, taken along section 4-4 of FIG. 3.
Figure 4B:
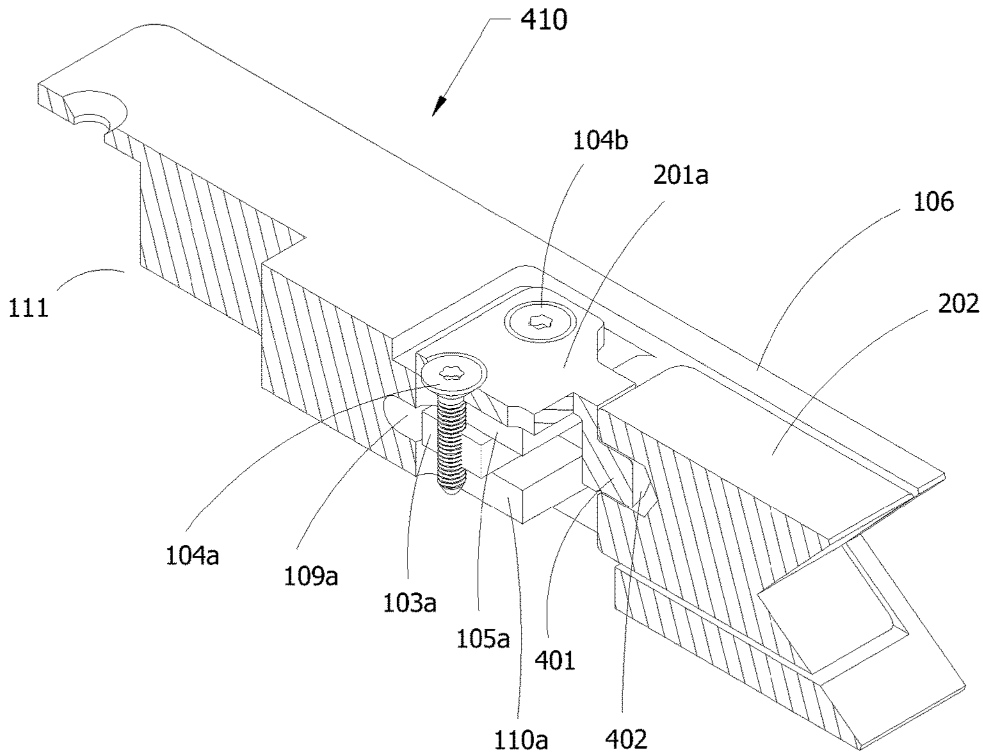
FIG. 4B is a magnified isometric view of FIG. 3, taken along section 44 of FIG. 3.

FIG. 4A, generally at 400, is a magnified cross section view of FIG. 3, taken along section 4-4 of FIG. 3. Similarly, 4B, generally at 410, is a magnified isometric view of FIG. 3, taken along section 4-4 of FIG. 2. FIGS. 4A and 4B are now discussed together. An extended portion 401 of bracket 201*a* engages a recess 402 in the body of the actuator 202. When screws 104*a*, 104*b* (and 104*c*, 104*d*, shown in FIG. 1) are loosened, the brackets 201*a* and 201*b* (shown in FIG. 2) and actuator 202 can be positioned along screw slots 102*a*, 102*b*, 102*c*, 102*d* (shown in FIG. 1). Screw slots 102*a*, 102*b*, 102*c*, 102*d* can be sized and positioned, for example, to allow actuator 202 to be positioned end-to-end within the cavity 101 of housing 106. One or more of screws 104*a*, 104*b*, 104*c*, and 104*d* can have a tapered end to facilitate easier centering of the screws 104*a*, 104*b*, 104*c*, and 104*d* into the respective threaded holes of the clamping plates 103*a*. 103*b*. When screws 104*a* and 104*b* (and 104*c* and 104*d*, shown in FIGS. 1 and 2) are tightened, the bottom surface of the bracket 201*a* and the top surface of the clamping plate 103*a* (and the bottom surface of the bracket 201*b* and the top surface of the clamping plate 103*b*) are drawn tight to the housing material 105*a*, 105*b*, thereby fixing the actuator 202 within the cavity 101.

Figure 5:
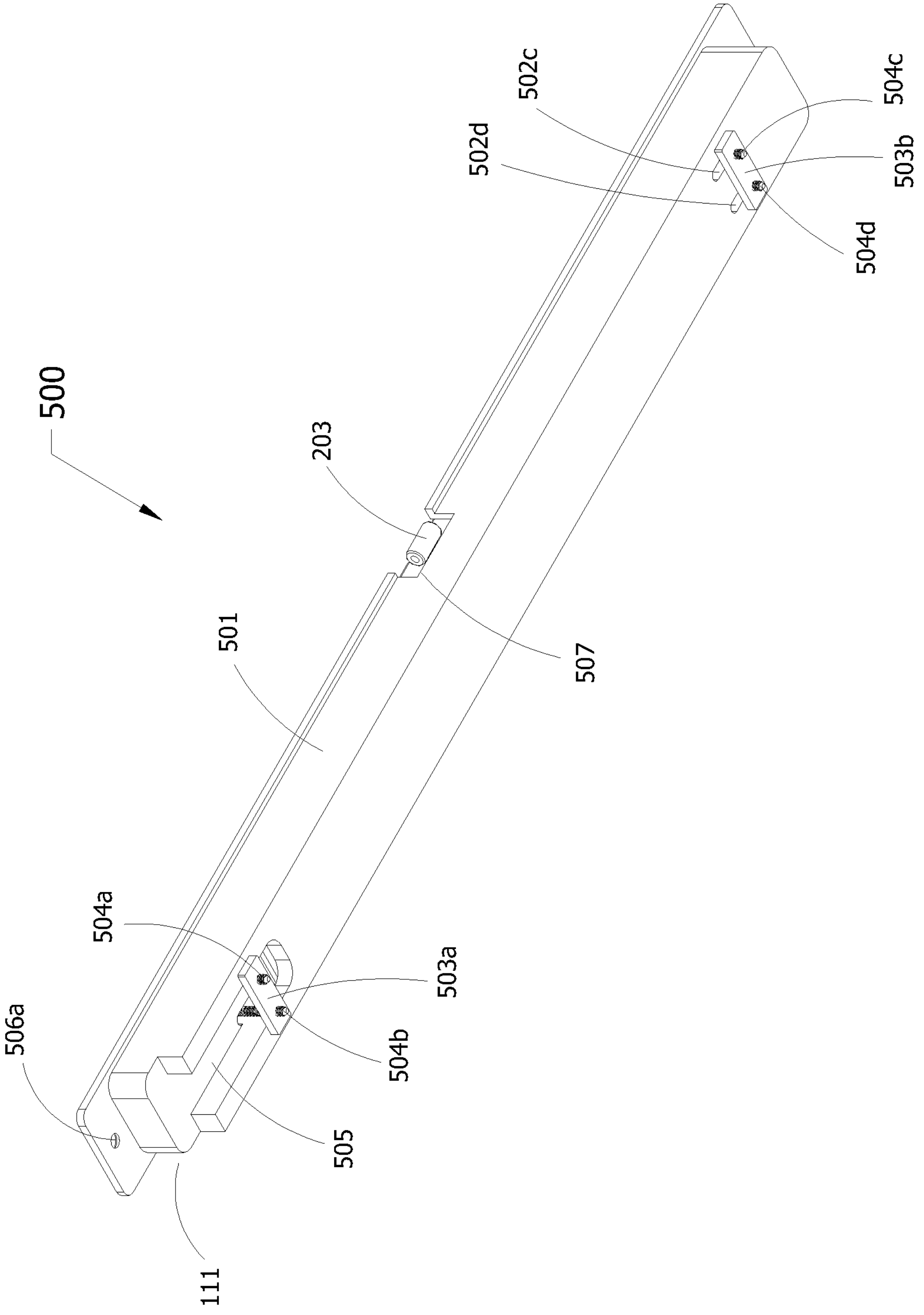
FIG. 5 is an isometric bottom view of a second embodiment of a window actuator housing, with an external clamping plate design.

FIG. 5, generally at 500, is a bottom isometric view of a second embodiment of a window actuator housing 501, with external clamping plates 503*a*, 503*b* (in contrast to the internal clamping plates 103*a*, 103*b* shown in FIGS. 1-4). The housing 501 has a cavity 508 (shown in FIG. 8) in which an actuator 202 (shown in FIG. 2) is inserted. The housing notch 507 provides space for actuator linkage 203 attached to the actuator chain 1404 (shown in FIGS. 15-18) to extend from and retract into the actuator 202. Screw holes 506*a* and 506*b* (shown in FIG. 6) provide for attaching the housing 501 to the window frame 1402 fixed in wall 1403, with the housing 501 generally recessed in the window frame 1402, as generally shown in FIGS. 14-18. Wiring channel 505 provides an opening for the actuator power wiring (not shown) to be routed out of the housing 501.

Figure 6:
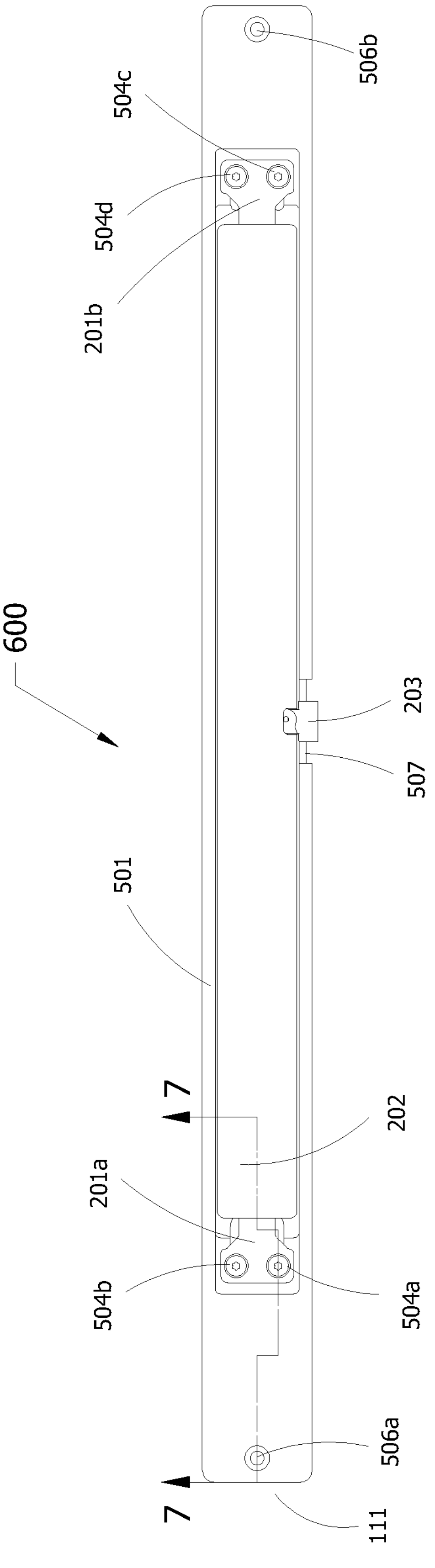
FIG. 6 is a top view of FIG. 5.
Figure 12:
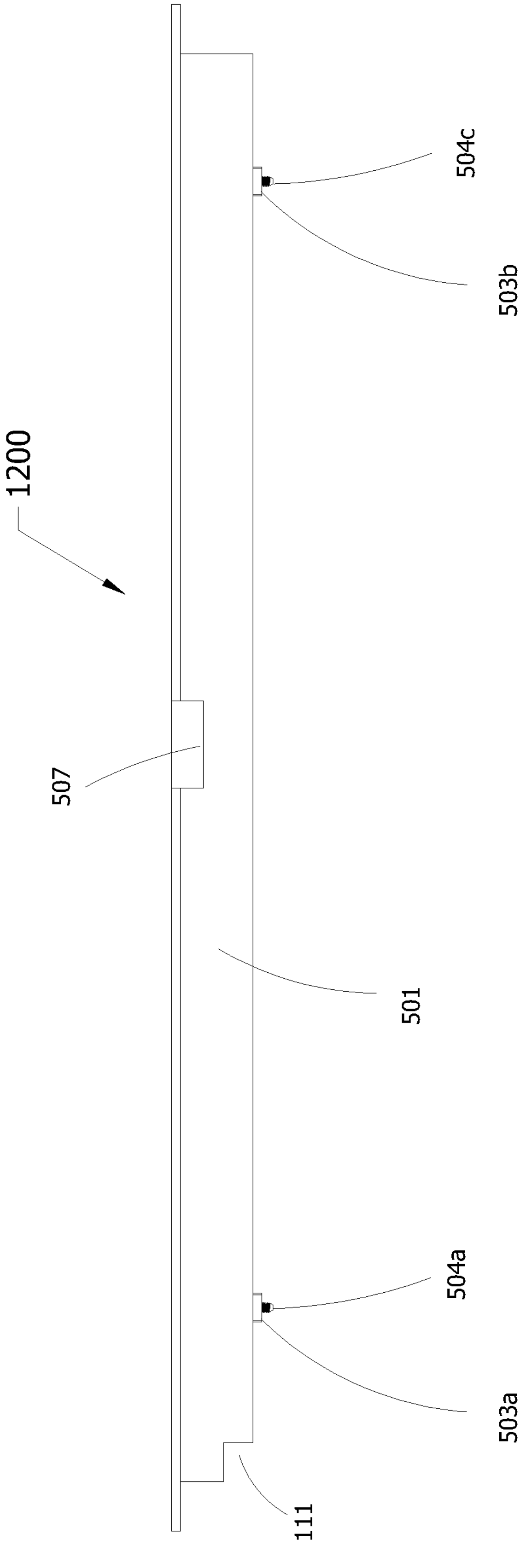
FIG. 12 is a side view of FIG. 8.
Figure 13:
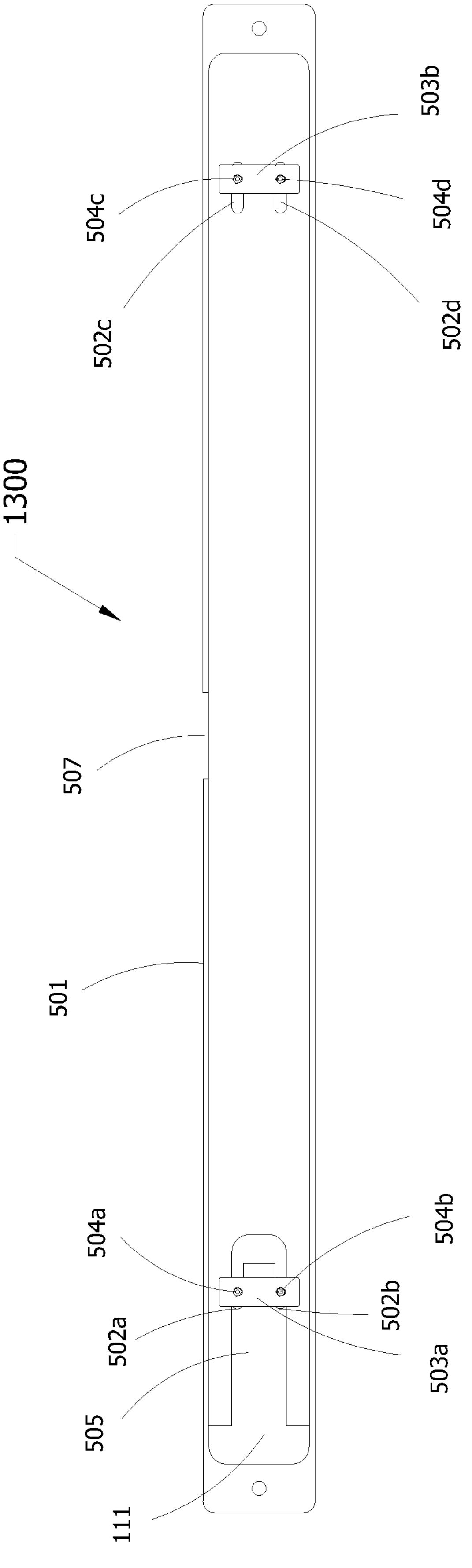
FIG. 13 is a bottom view of FIG. 8.

FIG. 6, generally at 600, is a top view of FIG. 5. FIG. 8 is an alternate perspective view of FIG. 5, without an actuator 202 positioned in the cavity 508 of housing 501. FIG. 12, generally at 1200, is a side view of FIG. 8. FIG. 13, generally at 1300, is a bottom view of FIG. 8. FIGS. 5, 6, 8, 12 and 13 will now be discussed together. Screws 504*a*, 504*b* respectively extend through screw slots 502*a*, 502*b* within housing material 701*a*, and through the threaded screw holes of clamping plate 503*a*. Similarly, screws 504*c*, 504*d* respectively extend through screw slots 502*c*, 502*d* within housing material 701*b*, and through the threaded screw holes of clamping plate 503*b*. Screws 504*a*, 504*b*, 504*c* and 504*d* will generally be longer than screws 104*a*, 104*b*, 104*c* and 104*d* because of the different respective arrangement of clamping plates 503*a*, 503*b* and 103*a*, 103*b*, as shown, for example, by comparing FIGS. 4A and 4B to FIGS. 7A and 7B.

Figure 15:
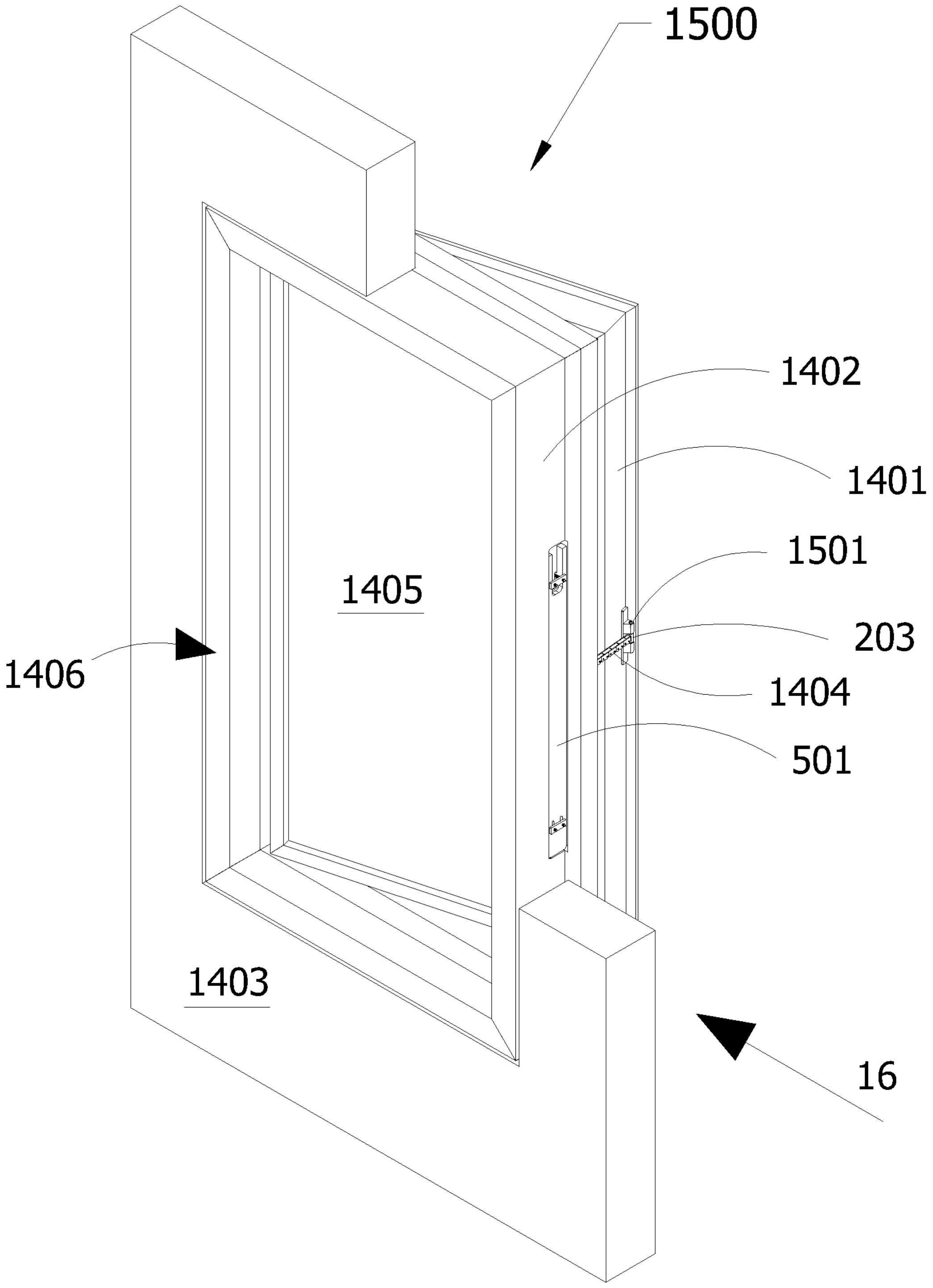
FIG. 15 is an isometric view of FIG. 14, rotated clockwise.
Figure 16:
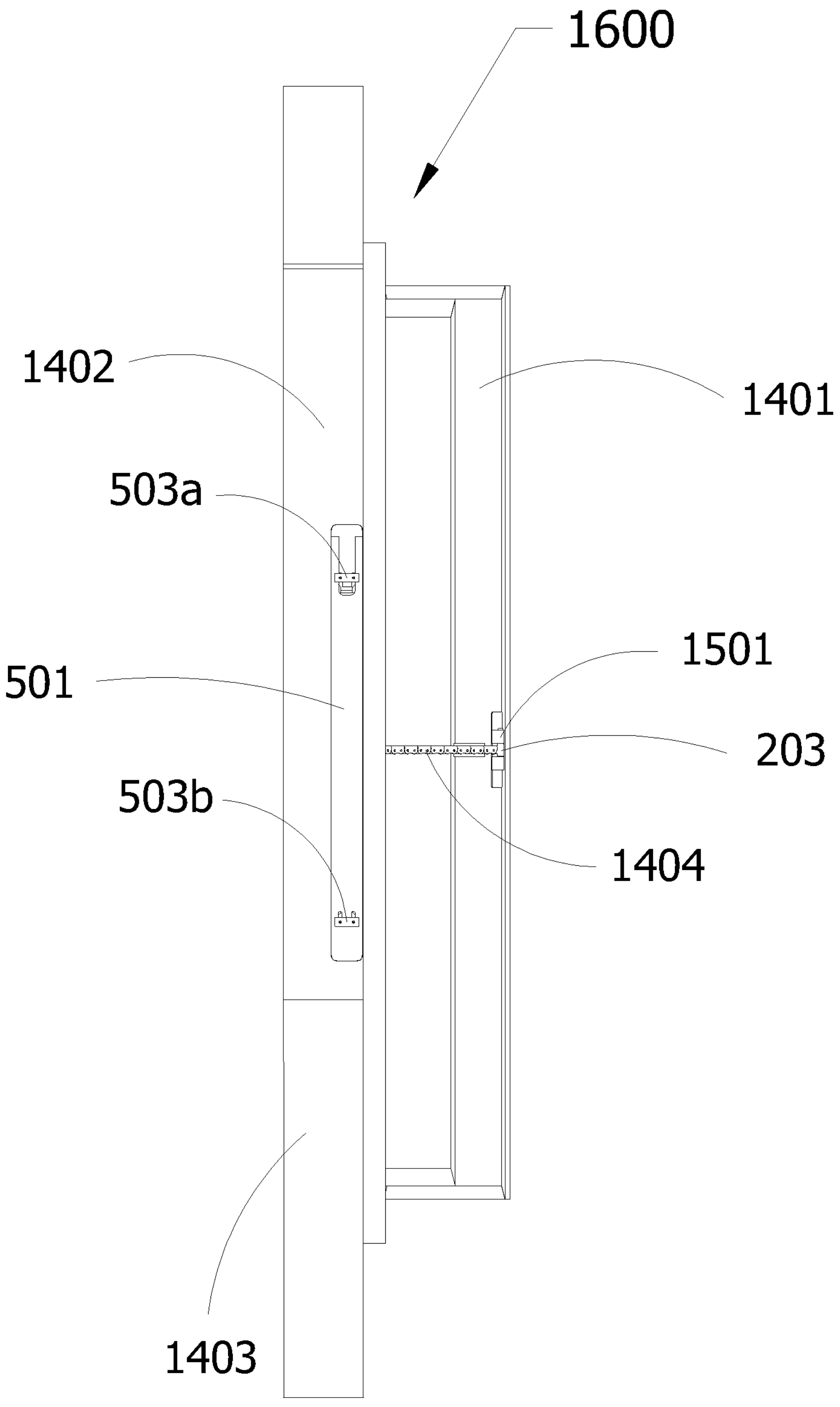
FIG. 16 is an elevation view of FIG. 15, viewed along arrow 16.
Figure 17:
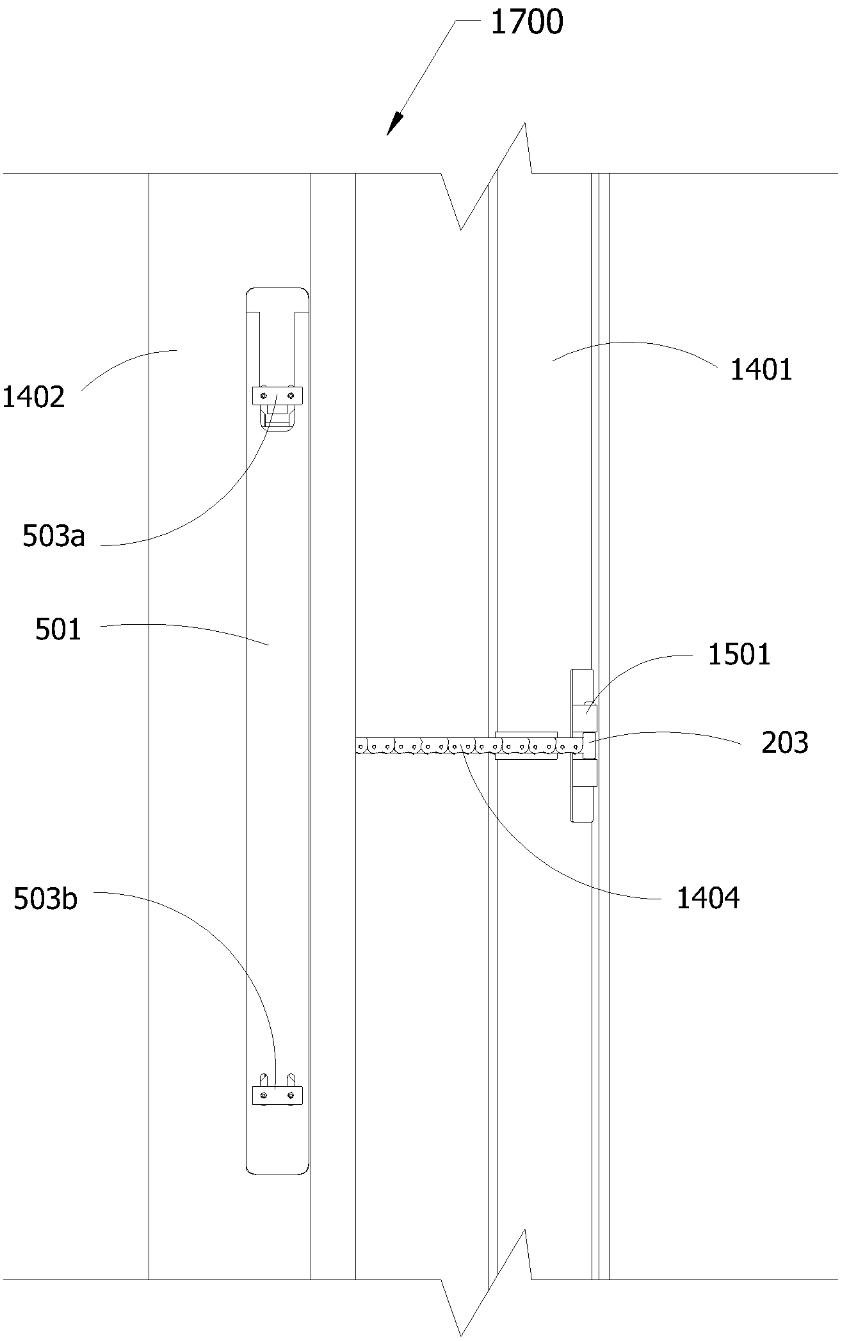
FIG. 17 is a magnified view of part of FIG. 16.

Brackets 201*a*, 201*b* allow the position of the actuator 202 to be adjusted along the length of the cavity 508. When screws 504*a*, 504*b*, 504*c*, and 504*d* are loosened, the actuator 202 and brackets 201*a* and 201*b* can be positioned laterally, end-to-end, within the cavity 508 of the housing 506 to facilitate quick and precise alignment of the actuator linkage 203 with a fixed linkage 1501 attached to a movable portion 1401 of a window, as shown in FIGS. 15-18. Screw holes 506*a* and 506*b* provide for attaching the housing 501 to a window frame 1402 fixed in wall 1403 (as shown in FIGS. 15-17).

Figure 7A:
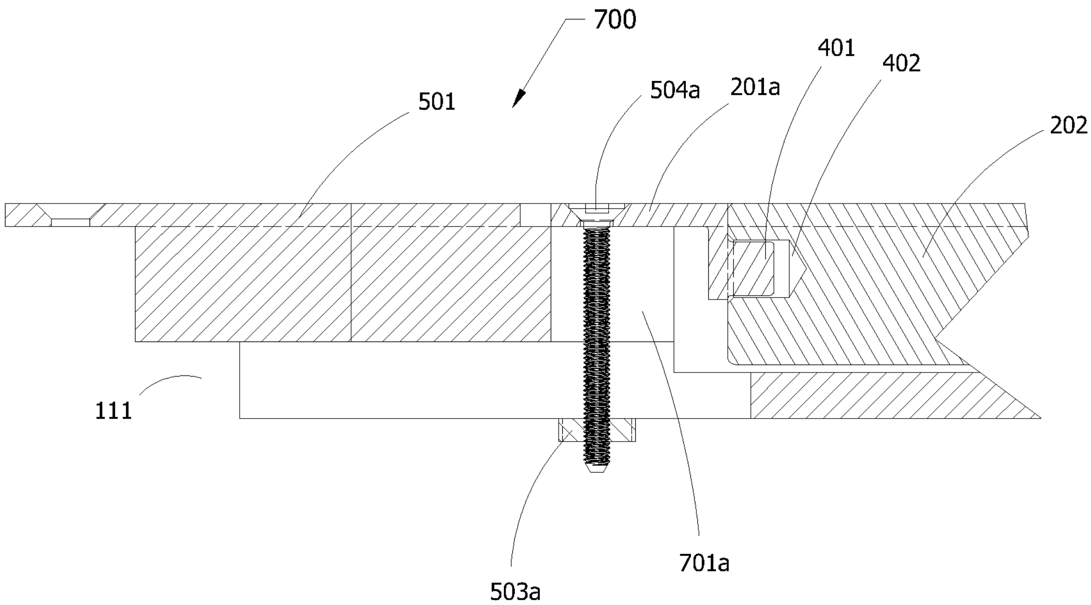
FIG. 7A is a magnified cross section view of FIG. 6, taken along section 7-7 of FIG. 6.
Figure 7B:
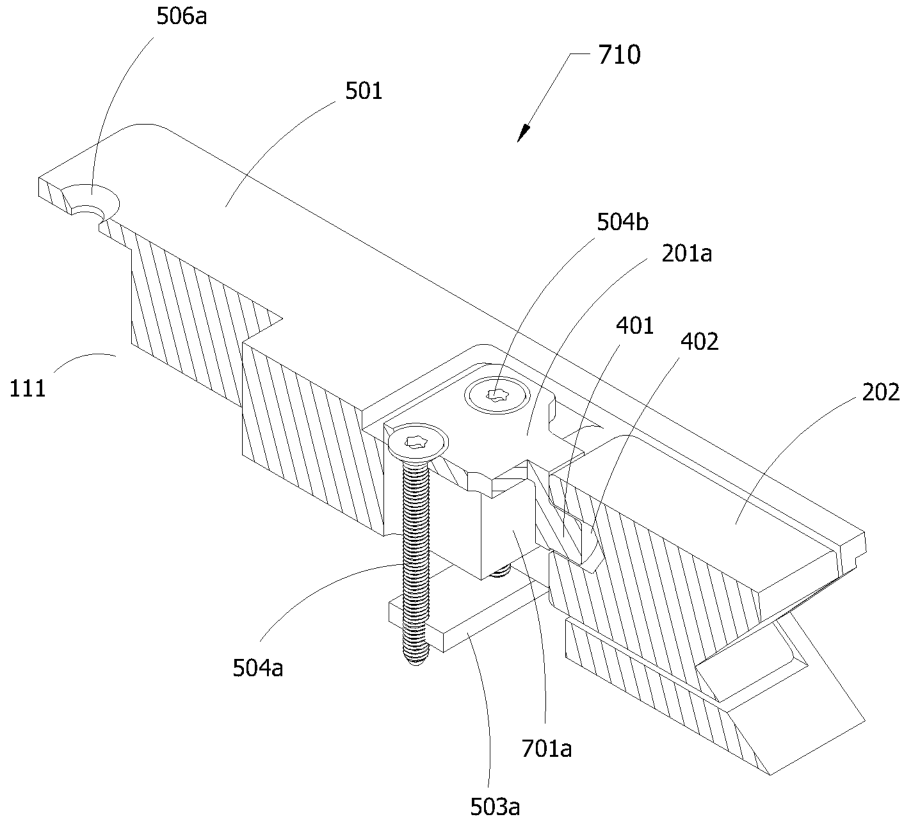
FIG. 7B is a magnified isometric view of FIG. 6, taken along section 7-7 of FIG. 6.
Figure 8:
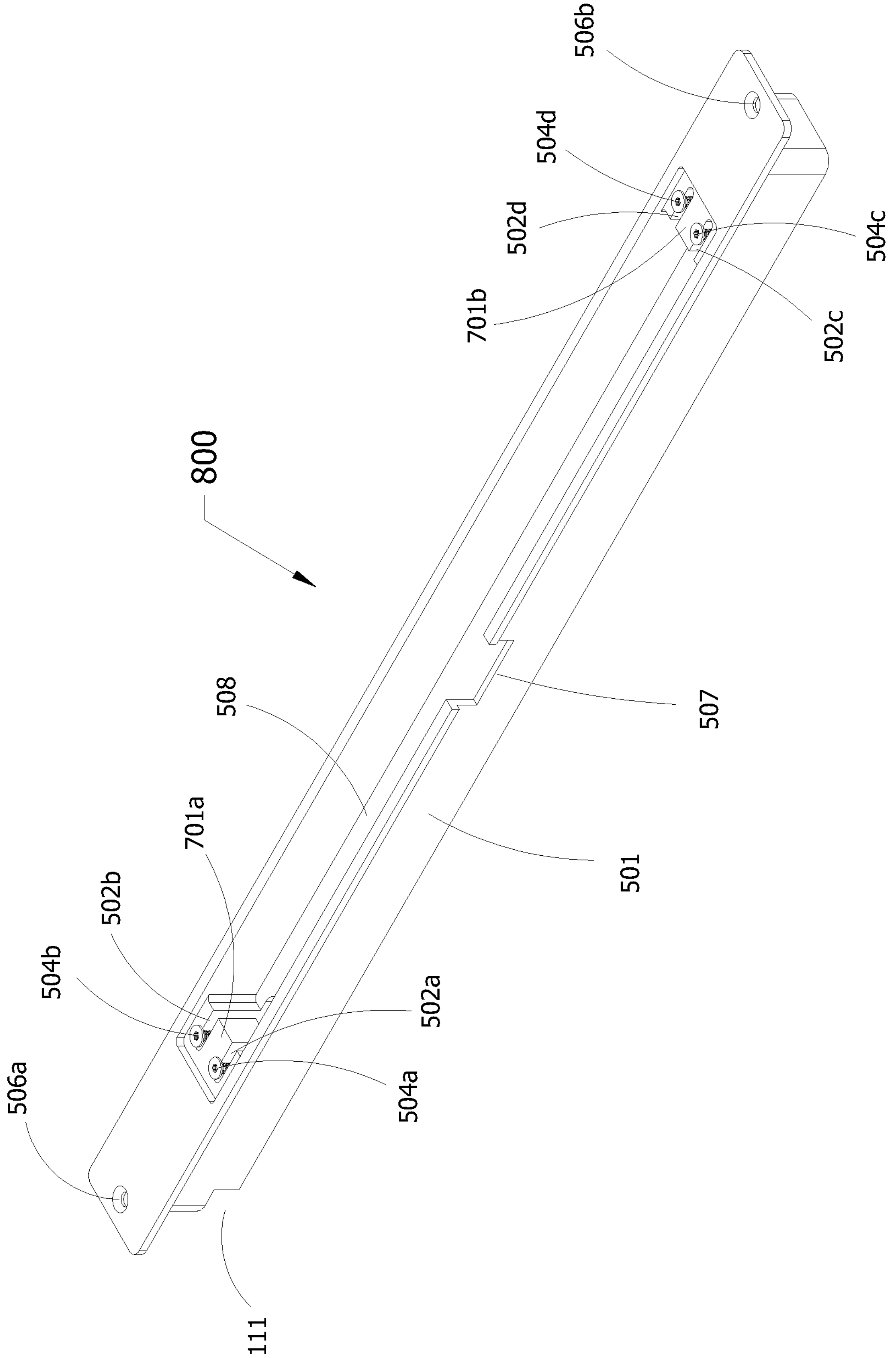
FIG. 8 is an alternate isometric view of FIG. 5, without an adjustable actuator attachment positioned in the housing.

FIG. 7A, generally at 700, is a magnified cross section view of FIG. 6, taken along section 7-7 of FIG. 6. Similarly, 7B, generally at 710, is a magnified isometric view of FIG. 6, taken along section 7-7 of FIG. 6. FIGS. 7A and 7B are now discussed together. An extended portion 401 of bracket 201*a* engages a recess 402 in the body of the actuator 202. When screws 504*a*, 504*b* (and 504*c*, 504*d*, shown in FIG. 5) are loosened, the brackets 201*a* (and 201*b*, shown in FIG. 6) and actuator 202 can be positioned along screw slots 502*a*, 502*b*, 502*c*, 502*d* (shown in FIG. 8). Screw slots 502*a*, 502*b*, 502*c*, 502*d* can be sized and positioned, for example, to allow actuator 202 to be positioned end-to-end within the cavity 508 of the housing 501. One or more of screws 502*a*, 502*b*, 502*c*, 502*d* can have a tapered end to facilitate easier centering of the screws 502*a*, 502*b*, 502*c*, 502*d* into the respective threaded holes of the clamping plates 503*a*, 503*b*

When screws 504*a* and 504*b* are tightened, the bottom surface of bracket 201*a* is drawn tight to the top surface of the housing material 701*a*, and the top surface of clamping plate 503*a* is drawn tight to the bottom surface of the housing 501. Similarly, when screws 504*c* and 504*d* (shown in FIGS. 5 and 6) are tightened, the bottom surface of bracket 201*b* is drawn tight to the top surface of the housing material 701*b*, and the top surface of clamping plate 503*b* is drawn tight to the bottom surface of the housing 501. Actuator 202 is thereby fixed within the cavity 508.

Figure 9:
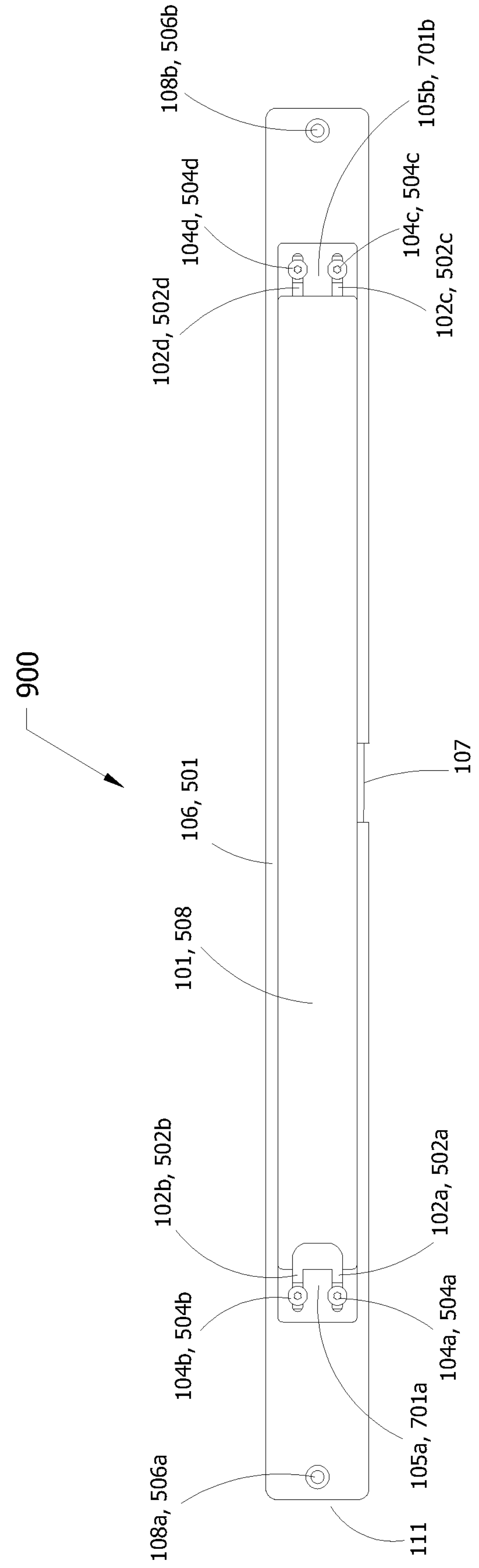
FIG. 9 is a top view of a window actuator housing of FIG. 1 and FIG. 8 (since the top view of FIG. 1

FIG. 9, generally at 900, is a top view of housing 106 (of FIG. 1) and housing 501 (of FIG. 8). From this view there is no distinguishable difference between housing 106 made for internal clamping plates (first embodiment) and housing 501 made for external clamping plates (second embodiment).

Figure 10:
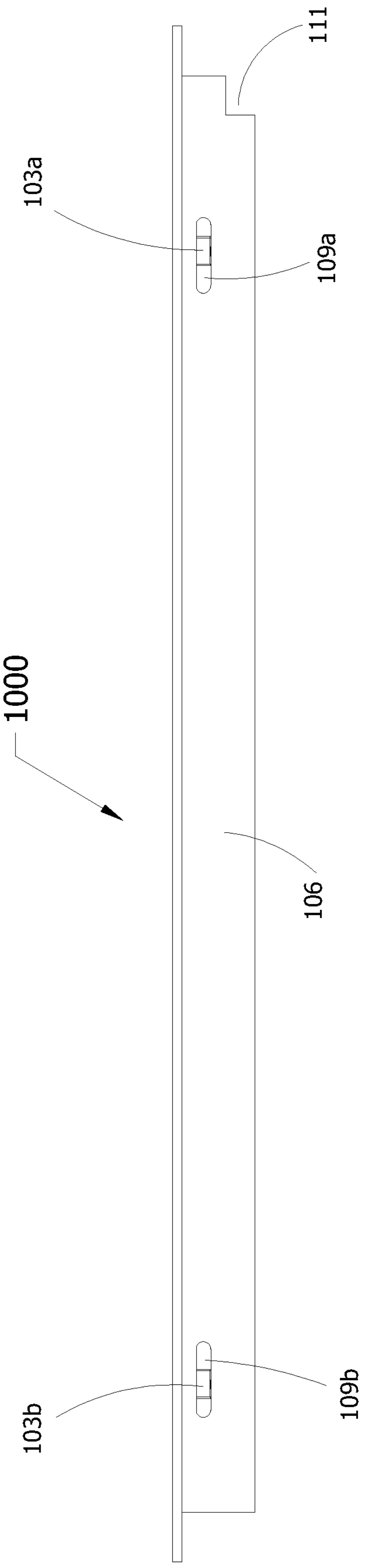
FIG. 10 is a side view of FIG. 1.

FIG. 10, generally at 1000, is a side view of FIG. 1. FIG. 10 shows clamping plate slots 109*a* and 109*b* and clamping plates 103*a* and 103*b* in perpendicular orientation to the long axis of housing 106.

Figure 14:
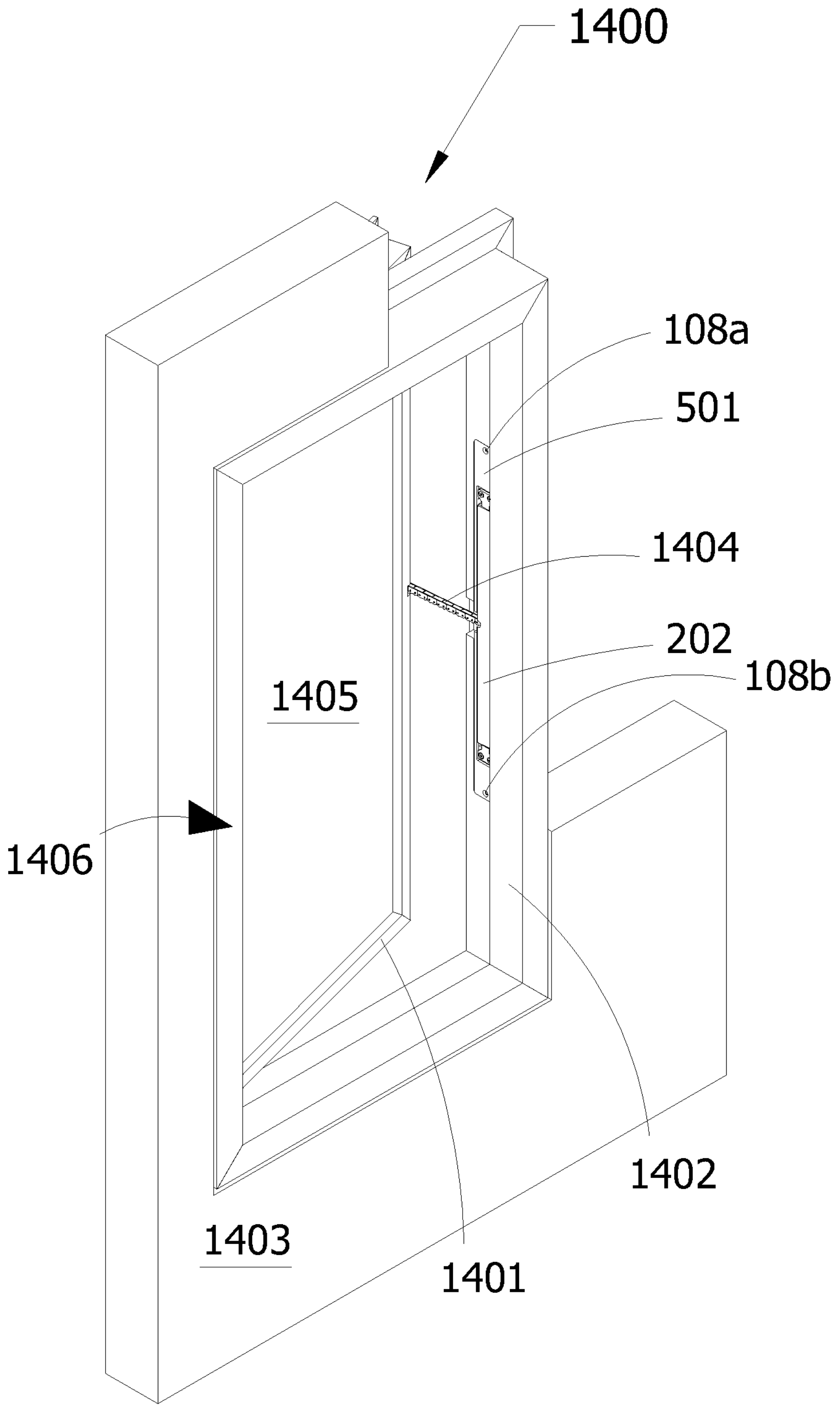
FIG. 14 is an isometric view of an assembly of an interior side of a window in a section of wall.

FIG. 14, generally at 1400, is an isometric view of an assembly of an interior side of a window 1406 that includes a frame 1402 fixed in the wall 1403, and a movable portion 1401 that is spanned by glass 1405. FIG. 14 shows the moveable portion 1401 of the window 1406 opened part-way by an extended actuator chain 1404 coming from an actuator 202 that is mounted on and recessed in a housing 501. Housing 501, in turn, is attached to the window frame 1402 fixed in the wall 1403, with the housing 501 generally recessed in the window frame 1402.

FIG. 15, generally at 1500, is an isometric view of the assembly in FIG. 14 rotated clockwise. The backside of the housing 501 is shown attached to the window frame 1402, with the housing 501 generally recessed in the window frame 1402. As also shown in FIGS. 16 and 17, actuator linkage 203 at the end of the actuator chain 1404 is connected to the linkage 1501 fixed to the movable portion of the window 1401.

FIG. 16, generally at 1600, is an elevation view of the assembly described in FIG. 15, viewed along arrowed line 16. The backside of the housing 501 is shown in the window frame 1402, with the housing 501 generally recessed in the window frame 1402. Clamping plates 503*a*, 503*b* are also shown. The actuator linkage 203 at the end of the actuator chain 1404 is connected to the linkage 1501 fixed to the movable portion of the window 1401.

FIG. 17, generally at 1700, is a magnified view of part of FIG. 16, showing the backside of the housing 501 with clamping plates 503*a* and 503*b*, and the actuator linkage 203 at the end of the actuator chain 1404 connected to the linkage 1501 fixed to the movable portion of the window 1401. Linkage 1501 has two portions, one being on a first side of the actuator linkage 203 and the second portion being on a second side of the actuator linkage 203. During installation, the actuator linkage 203 is inserted between the first and second portions of linkage 1501, and a screw or pin is inserted through the first portion of linkage 1501, then through the actuator linkage 203, and then through the second portion of linkage 1501, such as in an analogous manner to the two leafs of a door hinge and the hinge pin that holds them together.

Figure 18:
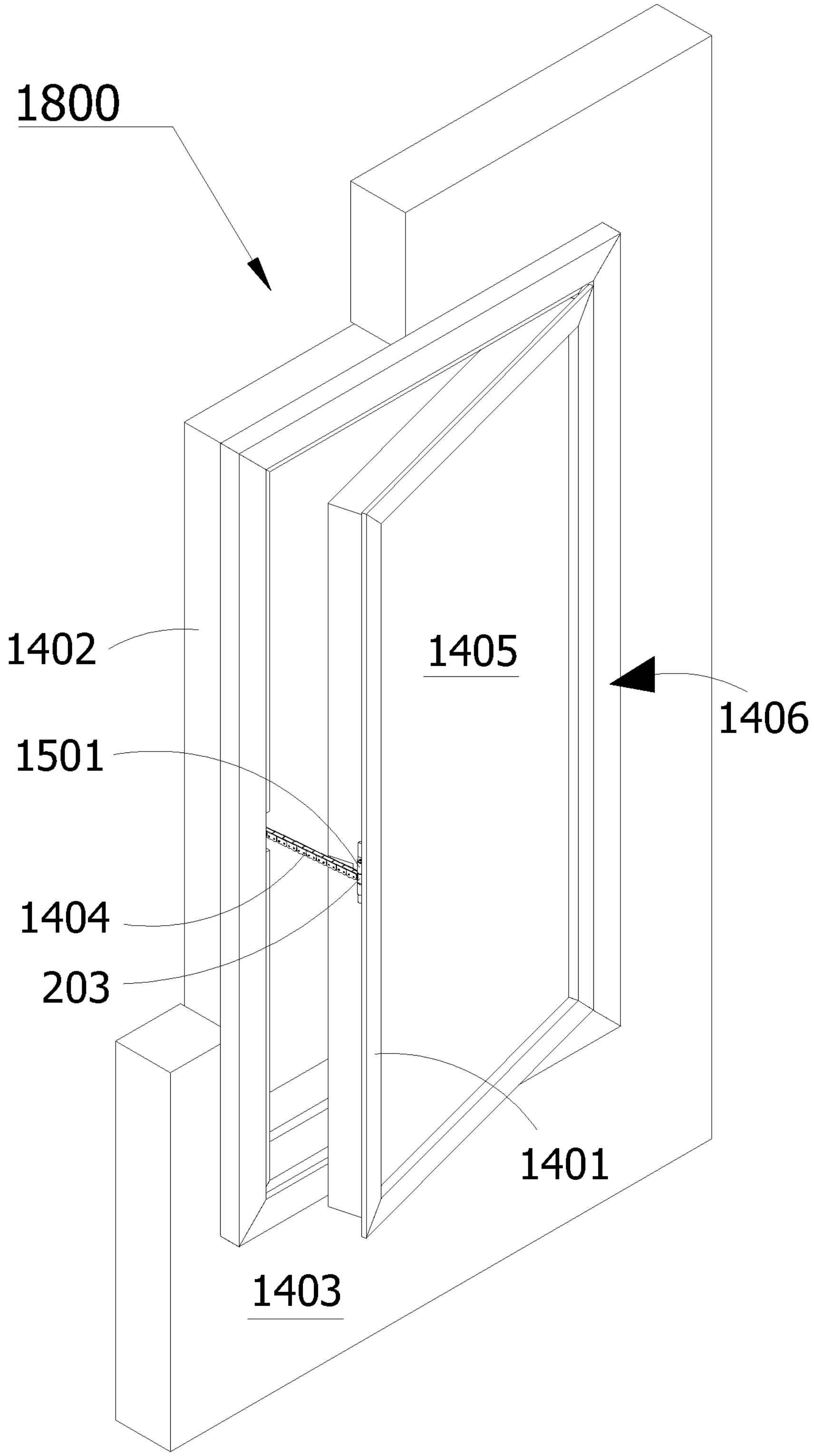
FIG. 18 is an isometric view of FIG. 15, further rotated clockwise relative to FIG. 15.

FIG. 18, generally at 1800, is an isometric view of FIG. 15, further rotated clockwise relative to FIG. 15. FIG. 18 shows an exterior side of a window 1406 in a section of wall 1403 with the movable portion of the window 1401 opened part-way by an extended actuator chain 1404. The actuator linkage 203 at the end of the actuator chain 1404 connected to the linkage 1501 fixed on the movable portion of the window 1401. The housing 501 and the actuator 202 installed in the window frame 1402 are not visible in this view.

What is claimed is:

1. A system comprising:
   - a housing comprising a cavity for mounting a motorized actuator,
   - the cavity comprising a length longer than a length of the actuator, thereby providing a first space between a first end of the actuator and a first end of the cavity, and providing a second space between an opposing second end of the actuator and an opposing second end of the cavity, when the actuator is laterally centered along the length of the housing;
   - a first bracket that attaches to the first end of the actuator, the first bracket comprising one or more holes through which a screw is inserted into one or more respective elongated slots in a first end of the housing;
   - a second bracket that attaches to the opposing second end of the actuator, the second bracket comprising one or more holes through which a screw is inserted into one or more respective elongated slots in a second opposing end of the housing;
   - a first clamping plate at the first end of the housing, threaded for receiving the screw inserted through the first bracket and elongated slot; and
   - a second clamping plate at the second opposing end of the housing, threaded for receiving the screw inserted through the second bracket and elongated slot;
   - wherein the actuator is positioned within said cavity while said screws are loose to allow for positioning said actuator along said elongated slots.

2. The system of claim 1, wherein the actuator is positioned so that a movable linkage of the actuator can be secured to a linkage fixed to a moveable portion of a window.

3. The system of claim 1, wherein the housing is affixed to a fixed portion of a window frame.

4. The system of claim 1, wherein the first clamping plate is positioned within the cavity, and at least one of the one or more elongated slots in the first end of the housing is positioned between the first bracket and the first clamping plate.

5. The system of claim 1, wherein the second clamping plate is positioned within the housing cavity, and at least one of the one or more elongated slots in the second end of the housing is positioned between the second bracket and the second clamping plate.

6. The system of claim 1, wherein the first clamping plate and the second clamping plate are positioned such that a top lateral surface of the clamping plates is in contact with a bottom lateral surface of the housing.

7. The system of claim 1, wherein the first and second brackets comprise an extended portion that respectively engages a first recess and a second recess in opposing sides of the actuator.

8. The system of claim 1, wherein the actuator is secured in position within said cavity when said screws are tightened.

* * * * *